United States Patent [19]

Stutz et al.

[11] Patent Number: 4,888,607

[45] Date of Patent: Dec. 19, 1989

[54] PHOTOGRAPH PROCESSING METHOD AND APPARATUS

[75] Inventors: William A. Stutz, San Jose; Laszlo A. Kiss, San Ramon; Joseph D. Rizzi, Los Altos Hills, all of Calif.

[73] Assignee: Alto Technology, San Jose, Calif.

[21] Appl. No.: 245,104

[22] Filed: Sep. 15, 1988

[51] Int. Cl.[4] ........................ G03D 3/04; G03D 13/04

[52] U.S. Cl. .................................... 354/323; 354/324; 354/330

[58] Field of Search ............... 354/312, 313, 314, 323, 354/324, 329, 330, 307

[56] References Cited

U.S. PATENT DOCUMENTS

| | | | |
|---|---|---|---|
| 3,792,487 | 2/1974 | Peres | 354/323 |
| 3,982,259 | 9/1976 | Baerle | 354/323 |
| 4,035,818 | 7/1977 | King | 354/323 |
| 4,067,034 | 1/1978 | Kwiatkowski | 354/307 |
| 4,206,993 | 6/1980 | Csepke | 354/323 |
| 4,291,968 | 9/1981 | Work | 354/313 |
| 4,293,212 | 10/1981 | Siryj et al. | |
| 4,372,375 | 2/1983 | Bond | |
| 4,410,034 | 10/1983 | Bernhardt et al. | 220/413 |
| 4,448,365 | 5/1984 | Petsching et al. | 354/341 |
| 4,453,817 | 6/1984 | Clark | 354/323 |
| 4,473,283 | 9/1984 | Bernhardt et al. | 354/323 |
| 4,492,447 | 1/1985 | Taylor | 354/330 |
| 4,586,805 | 5/1986 | Bockemuhl-Simon et al. | 354/323 |
| 4,751,541 | 6/1988 | Goertz et al. | 354/330 |

OTHER PUBLICATIONS

JOBO Fototechnic Sales Brochure (1987).

*Primary Examiner*—A. A. Mathews
*Attorney, Agent, or Firm*—Townsend and Townsend

[57] ABSTRACT

A method and apparatus for developing photographic film and paper. A plurality of storage tanks flow by gravity into a common manifold. The manifold directs the fluid flow to a rotating drum assembly. After mixing, the fluid flows into a catch basin and, further, into one of a plurality of drain tanks. Electronic control circuitry is also disclosed.

13 Claims, 8 Drawing Sheets

PHOTOGRAPH PROCESSING METHOD AND APPARATUS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention is related to the field of photograph processors. In particular, the present invention provides an improved method of developing photographic film, paper, and the like.

2. Description of Related Art

A wide variety of automated and manual photograph film and paper developing systems have been proposed in the past. Manual photograph processors include systems in which developing chemicals are poured into a light-tight drum containing photographic material, and the drum is placed on a roller for a desired amount of time. The drum is then manually removed from the roller, and the chemical is poured from the drum by the user. Such manual systems have also been supplemented with a "lift" from which chemicals can be poured into/out of the drum.

Such manual systems require constant attention by the user and are prone to errors. Such errors arise because, for example, the user may be distracted and not remove a chemical at the optimum time, or does not account for the time a chemical is in contact with the photographic film while the chemical is being poured from the drum.

In order to overcome these problems, a wide variety of automated processors have been proposed. Such processors use air pressure and/or pumps to move chemistry from one location to the next within the processor. Chemicals are pumped into the processing drum, agitated with the paper or film for a pre-determined period of time, poured from the drum, the next chemical is pumped into the drum, and the process is repeated. Automated processors may also include a mechanism for timing the mixing time of the chemicals and for controlling the agitation speed of the drum. The complexity of such processors has relegated their use almost solely to commercial laboratories because of their extremely high cost. Hobbyists have, therefore, been generally unable to acquire and use such devices. Automated processors are described in, for example, U.S. Pat. No. 4,035,818. Automated processors in the marketplace include those marketed by JOBO Fototechnic, Inc. such as the "Autolab ATL3."

It is desirable, therefore, to provide an improved photograph processing method and apparatus which could greatly decrease the cost of such systems.

SUMMARY OF THE INVENTION

The present invention provides a greatly improved automated photograph processor which could be manufactured and sold at a price that would be acceptable to hobbyists. The invention includes a number of chemical dispensing tanks located above a light-tight drum. A rotating cam engages a valve on one of the chemical dispensing tanks. The chemical flows by gravity into the drum and is agitated for a time pre-set by the user. After agitation, the drum is rotated such that the chemical flows by gravity out of the drum and into a first drain tank, which is on a rotating table that contains a number of such drain tanks.

After draining the chemical is drained from the drum, the rotating cam engages a valve on a second chemical dispensing tank. The second chemical also flows by gravity into the drum and is agitated for a second period of time, the second period of time having been set by the user. After agitation, the second chemical flows downward by gravity into a second drain tank, which has been appropriately positioned by the rotating table. The rotating table and the cam are preferably rotated by the same rotating shaft. The invention provides all chemical flow through the system by gravity flow. Further, a common "drive" system is used to dispense the chemicals and position the drain tanks. The light-tight drum is held firm and rotated from its end having a drain port. This greatly reduces the "footprint" of the processor, making the processor suitable when available space is limited.

Greatly improved electronics for controlling the processor are also provided. The electronics serve, for example, a) to insure that the motors stop at a precise location, b) to vary the dispensing time for the chemical based on the liquid level in the storage tanks, c) to detect the position of the rotating cam/table so as to place them in the appropriate position, d) to carry out the functions of the processor using a more economical EPROM, instead of, for example, a microprocessor, and e) to adjust the amount of power provided to the agitation motor based on the load in the drum.

The chemical dispensing time is adjusted by placing electrodes in the chemical dispensing tanks and an electrode in a surrounding water bath. The walls of the dispensing tanks are made of PVC or the like. A capacitor is, therefore, established with the bath and chemical acting as electrodes and the wall acting as a dielectric. The capacitance of this capacitor is related to the height of liquid in the tanks. The threshold of a timer controlling the opening time for each tank is adjusted based on this capacitance.

An inexpensive and reliable valve assembly for a photograph processor is also disclosed. The valve includes a body containing a spring-loaded arm which pinches a flexible flow line. The arm is urged away from the flow line by way of a rotating cam engaging a cam-following roller on a shaft holding the arm.

In one embodiment, the apparatus includes a cylindrical, light-tight means for holding the material in a rolled fashion, the means for holding having a drain port; means for rotating the means for holding from a first position to a second position, the first position arranged to drain a liquid from said means for holding from the drain port, the second position arranged to retain a liquid in the means for holding; means for rotating the means for holding about its axis while in the second position; at least a first and a second means for storing at least a first and a second processing fluid, respectively, the means for storing arranged above the means for holding, so as to feed liquid into the means for holding by gravity, and further comprising first and second valve-operated drain means, respectively, on the first and second means for storing; a manifold means, said manifold means operably connected to the valve-operated drain means on the first and the second means for storing, the manifold means draining to the drain port by gravity; a rotatable table under the means for holding, the rotatable table holding at least a third and a fourth means for storing the first and the second processing fluid, respectively, the rotatable table driven by a rotating shaft; cam means on the rotating shaft, the cam means opening the valve-operated drain means when aligned therewith; tubular means oriented to drain liquid from the means for holding to a position above the rotatable table when the means for holding is in the first position; control means, the control means adapted to orient said processor in sequential configurations, the configurations including a first configuration in which the first valve-operated drain is opened by said cam, the second valve-operated drain is closed, and the means for holding is in the second position and, thereafter; a second configuration in which the first and the second valve-operated drains are closed, the means for holding is in the second position, and the means for rotating the means for holding about its axis rotates the means for holding and, thereafter; a third configuration in which the first and the second valve means are closed, the means for holding is rotated into the first position by the means for rotating from a first position to a second position and the means for holding drains through tubular means and into the third means for storing and, thereafter; a fourth configuration in which the second operated drain is opened by said cam, the first operated drain is closed and the means for holding is in the second position and, thereafter; the second configuration and, thereafter; a fifth configuration in which the first and the second valve means are closed, the means for holding is rotated into the first position by the means for rotating from a first position to a second position, and the means for holding drains through the tubular means into the fourth means for storing.

In another embodiment the apparatus includes at least two chemical storage vessels; manifold and valve means for selectively distributing fluids from the chemical storage vessels to a common drain point; drum means for holding the photographic material, the drum means having a port connected to the manifold and located to receive flow therefrom by gravity flow; means for agitating a liquid in the drum means; means for rotating the drum from a substantially horizontal position to a position in which a liquid would flow out from said port to a drain; and means located below the drain for selectively flowing liquid from the drain into one of at least two chemical receiving vessels.

In another embodiment the apparatus comprises means for receiving a plurality of processing chemicals; means, below said means for receiving, for holding a photograph processing container, said means for holding having a port connected to said means for receiving and adapted to distribute fluid to a photograph processing container by gravity flow; means for rotating said means for holding to a position in which a liquid would flow out from said port to a drain, and; means located below said drain for selectively flowing liquid from said drain into one of at least two chemical receiving vessels. A kit for a photograph processor is also disclosed.

DESCRIPTION OF THE PREFERRED EMBODIMENTS

Figure 1:
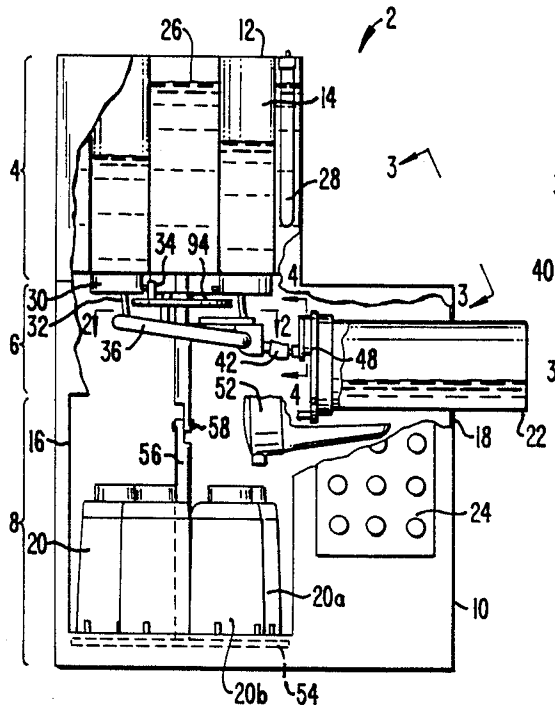
FIG. 1 shows the photograph processing apparatus in front view, partially cut away. The drum is in the "rotate" position.

FIG. 1 shows the photograph processor 2, viewed from the front and partially cut away. In general, chemicals flow by gravity through the processor from a storage section 4 to a dispensing and agitation section 6 to a drain storage section 8.

The processor includes a case 10 which protects the internals from damage, debris, and the like. The case has an open top 12 which permits the chemical storage tanks 14 to be easily filled and cleaned. Tanks 14 may also be provided with substantially air-tight lids (not shown) to increase the lifetime of the chemicals stored therein. A removable top (not shown) on the open top 12 may also be provided so as to prevent the entry of debris into the chemical storage tanks and water bath.

The case 10 has a front opening 16 and side opening 18. The front opening permits easy ingress and egress of the chemical drain tanks 20. Side opening 18 permits the user to easily install and remove the drum 22, which holds the photographic material. "Photographic material" is meant herein to include photograph paper, photographic negatives, x-ray slides, and the like. The drum is mounted and rotated from its end (having a drain port), permitting the processor to have a smaller footprint than if it was mounted and turned from its side.

The case is preferably made of ABS plastic, although a variety of plastics such as PVC (polyvinyl chloride), polyethylene and the like could also be used. A variety of metals (preferably stainless steel) could also be used.

The front of the case also contains a control panel 24. The control panel contains start and stop switches, as well as controls which dictate the amount of the chemicals to be utilized, the speed of rotation, the mixing time for each of the process chemicals contained in the storage tanks, and the number of chemicals to be used.

In the storage section 4 each of the storage tanks 14 are positioned in a generally circular arrangement. The storage section is water-tight so that it may be filled with water or the like to a level 26 and acts as a water bath for the storage tanks. Level 26 is maintained at a constant and full level for proper function of the fill control system. A level gauge or window (not shown) is provided so that the water level can be determined from outside the case. Heater 28 is inserted into the water bath and is thermostatically controlled so as to maintain the water bath at a constant desired temperature. Heater 28 may, for example, be a tropical fish heater which operates on household current. For a room-temperature process, heater 28 would not be necessary.

Storage tanks 14 are preferably manufactured of PVC or other electrically insulating material with a predictable, regular dielectric constant and are each designed to hold approximately 1.0 liter of photograph processing chemical. Six storage tanks are preferably provided. By providing six storage tanks, common three-chemical processes can be used with a "water wash" after each, or more steps can be used without a water wash. At the bottom of each storage tank a normally closed valve 30 is provided which drains to a storage tank drain line 32, which is preferably made of a flexible material such as elastomeric vinyl, plasticized vinyl, or the like. In general, valve 30 is a spring-biased device which normally "pinches" drain line 32. Upon urging of the spring-biased valve away from the drain line by cam 34, fluid is permitted to flow through the drain line 32.

Manifold 36 is installed below tanks 14 at an angle such that liquid flows from the tanks, through the manifold, downward to a collection line 42, which further directs the flowing fluid into drum 22 (see FIGS. 1-4).

FIG. 1 illustrates drum 22 in the horizontal mixing position. Drum 22 is generally shaped in the form of a right cylinder and holds photographic paper, negatives, or the like in a rolled fashion. Drum 22 could be, for example, a JOBO "Filmdrum" modified by providing an accessory ring to create a groove from which the drum may be held and rotated from the end having a drain port.

Figure 2:
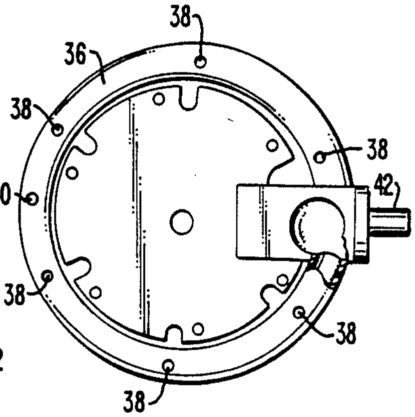
FIG. 2 shows the manifold, viewed from above.
Figure 4:
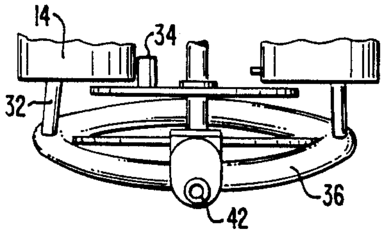
FIG. 4 shows the manifold, viewed from the right side.

FIGS. 2 and 4 show the drain manifold from the top and side, respectively. Each drain line 32 flows downward into a circular manifold 36 through manifold chemical ports 38. Manifold 36 is shown herein as a circular manifold, but a wide variety of shapes could be readily used by those of reasonable skill in the art. For example, each drain line 32 could flow directly to a single linear manifold, or the like. A circular arrangement provides for ease of manufacturing and cleaning. An additional tube (not shown) can be installed in auxiliary fluid port 40 into which water may be introduced. Other processing chemicals could also be manually introduced into port 40 if, for example, a particular process required more than six chemicals. Alternatively, if the process requires less than six chemicals (e.g., three chemicals) alternate tanks 14 could be filled with water to prevent reverse mixing of the chemicals.

Figure 3:
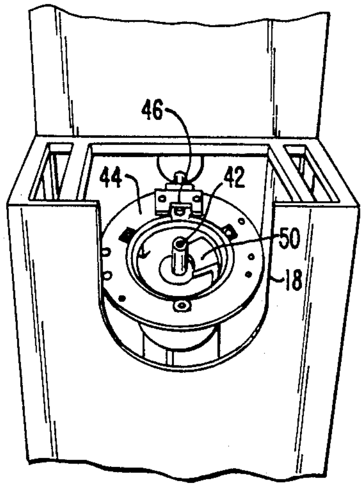
FIG. 3 shows the drum drain rotation mechanism in the "drain" position.

FIG. 3 shows the holding flange 44 from above. Clip 46 rotatably retains drum 22 against flange 44, and permits drum 22 to rotate about an axis through its center, when in the horizontal position. Alternatively, two clips may be provided at, for example, 60°-90° degrees apart. Teeth (not shown) around drum drain port 48 engage teeth in rotation assembly 50, which rotate drum 22, thereby providing thorough mixing action in drum between the photographic materials and chemicals contained therein. The processor may also be programmed, if desired to rotate the drum while the drum is rotated into the drain position. A reversible electronic motor drive system could also be provided.

The drain system 8 is illustrated in FIG. 1. Catch basin 52 is oriented to receive chemical from drum 22 when it is rotated into a "drain" position from holding flange 44. When the drum is in the drain position, material flows by gravity through drum drain port 48, into catch basin 52, and further into drain tank 20*a*. Drain tanks 20 (which are preferably made of polyethylene plastic or the like) are placed on a rotating table 54. Extending upward from rotating table 54 is a drive rod 56, which is driven by a motor (not shown). Drive rod 56 is preferably constructed in two sections and connected with a screw 58. By constructing the rod in two pieces, the carousel table 54 can be readily removed for cleaning. Alternatively, table 54 may be replaced with a bucket (not shown) if selective chemical recovery is not desired.

In operation, the processor generally performs as follows. Drum 22 begins in a horizontal position. Cam 34 is rotated by drive rod 56 to be in alignment with a valve 30 on a tank 14 (which contains a first desired chemical) for a time dependent upon the amount of chemical specified by the user in combination with the fluid level in the tanks. Valve 30 is thereby opened, permitting fluid to flow downward through drain tube 32 into manifold 36 and further flow into drum 22 through port 48 from collection line 42. Thereafter, drive rod 56 rotates away from valve 30, and stops the flow of fluid.

At the same time as cam 34 is rotated into engagement with valve 30, drum 22 begins to be rotated by rotation assembly 46 so as to mix the chemical and photographic material contained therein, and continues for a time specified by the user on the control panel. Rod 56 rotates a first drain tank 20*a* into alignment with catch basin 52 when cam 15 is rotated away from valve 13. Flange 44 (and, therefore, drum 22) are then rotated into the "up" position so that fluid flows into catch basin 52, and further into drain tank 20*a*. This occurs for a period of time specified in the electronics of the machinery.

After the tank is drained, drum 22 is again rotated into the horizontal position. Drive rod 56 rotates the cam into alignment with a second valve 30 on another storage tank 14. Chemical again flows into drum 22 and is mixed. Tray 54 is rotated by drive rod 56 when the valve is closed such that a second drain tank 20*b* is positioned to receive fluid from drum 22 when it is rotated into the drain position. The process continues to be carried out for a plurality of chemicals stored in storage tanks 14.

Figure 5:
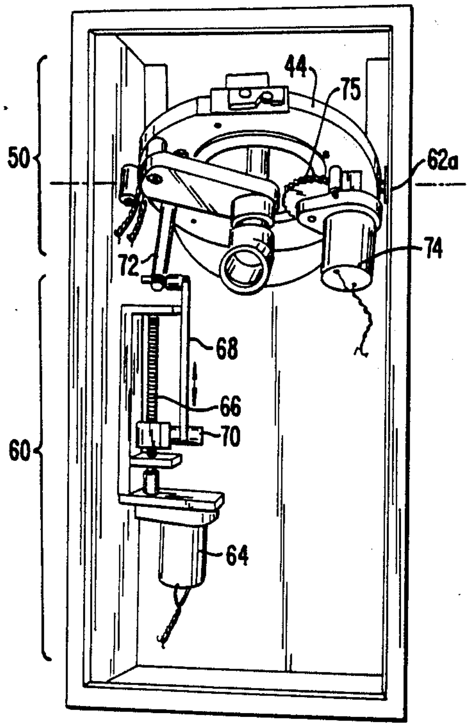
FIG. 5 shows the drum rotation assembly and lifting assembly, viewed from the left side of the processor.
Figure 6:
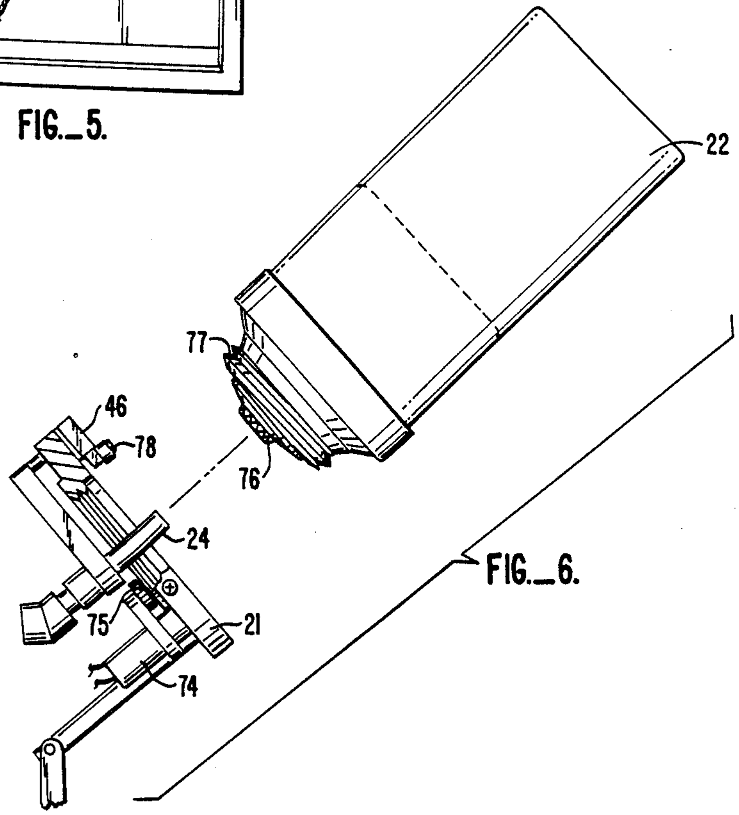
FIG. 6 shows the drum rotation and engaging assemblies, as viewed from the front side.

Greater details regarding lifting assembly 60 are provided in FIG. 5. Flange 44 pivots about flange rotation points 62*a* (shown) and 62*b* (not shown). Lift motor 64 rotates threaded shaft 66 onto which linkage 68 is mounted at threaded connection 70. Linkage 68 is connected to lever 72 which is further connected at an end to flange 44 at a position offset from rotation points 62*a* and 62*b*. As motor 64 rotates in a first direction, threaded connection 70 moves down shaft 66 and, therefore, rotates flange 44 such that the drum is placed into the drain position (as shown in FIG. 6). Conversely, as the direction of motor 64 is reversed, threaded shaft 70 moves threaded connection 70 and, therefore, the drum back to the horizontal position shown in FIG. 1.

The rotation assembly 50 is illustrated in greater detail in FIG. 6. Rotation motor 74 is used to rotate the drum for mixing of chemicals with the photographic material. Motor 74 drives gear 75 which, in turn, engages cog 76 on drum 22. Clip 46 engages groove 77 which is added to drum 22 to retain the drum thereon at the "drain" end. Clip 46 further includes a bearing 78, which allows the drum to freely rotate. Bearing 78 is slidably mounted in clip 46 to allow easy engagement and disengagement of the drum.

Figure 7:
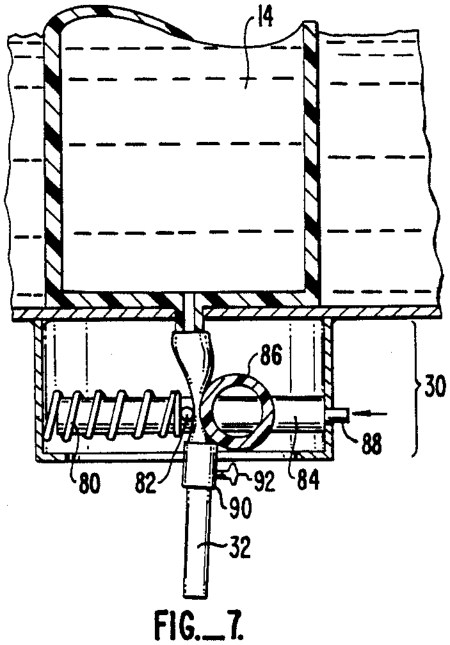
FIG. 7 shows the valve assembly.

Greater detail regarding the valve assembly 30 is provided in FIG. 7, which shows the valve in a closed position. When in the closed position, spring 80 urges arm 82 on shaft 84 against drain line 32, pinching the drain line between arm 82 and block 86. A cam following roller 88 extends through the wall of the body of valve 30. As cam 34 (not shown) rotates into contact with the roller 88, arm 82 on the shaft 84 is urged away from the drain line, permitting chemicals to flow through. As the cam rotates away from the roller, the drain line is again pinched between arm 82 and block 86 (which, as shown, is a small piece of pipe through which shaft 40 extends), stopping the flow of chemical. Sleeve 90 with a screw 92 may also be placed around drain line 32. Screw 92 is used as a calibration control to provide for a matching of flow rates from the tanks 14. By using a circular block 86, the contact area is minimized with the drain line, requiring a smaller, lower force spring.

FIGS. 8A to 8F provide details of the timing and control circuitry. The circuitry is briefly described below.

Figure 8A:
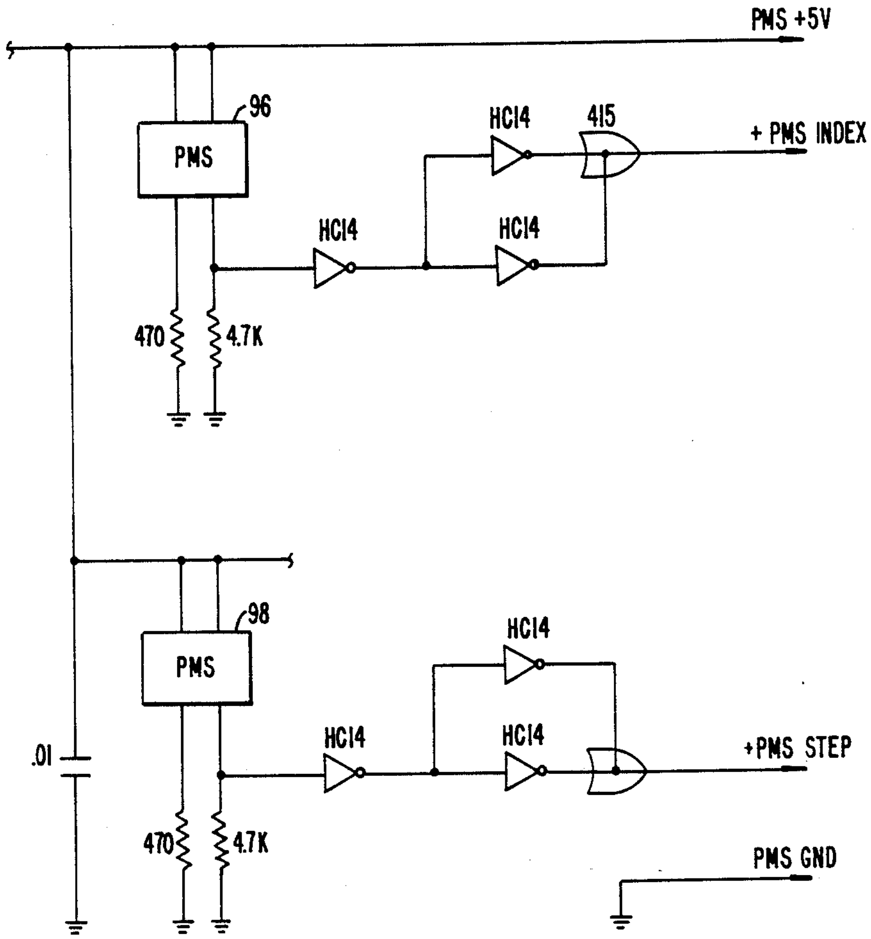
FIGS. 8A–F show the timing and control circuit for the invention.

FIG. 8A illustrates the photo micro sensor circuitry. The circuit serves to read information from a series of dark/light code bars on the bottom of a wheel 94. Photo micro sensors (PMS) 96 and 98 are mounted below wheel 94 and may be, for example, those manufactured by OMRON Corporation. PMS 96 serves to generate a signal +PMS INDEX and PMS 98 serves to generate a signal +PMS STEP, with the passing light colored bars on wheel 94. A total of 12 generally equally divided stop locations (light bars) are marked on the bottom of plate 94 (two for each of 6 chemicals).

The angular width of the light portion of the dark/light code bars and the angular distance between PMS 96 and PMS 98 is such that signals +PMS INDEX and PMS STEP will be both activated when and only when cam 34 and tray 54 have been rotated to correspond to a terminal or initial position wherein the sixth of six drain tanks is positioned to receive fluids from drum 22, for example. Eleven light "spots" are provided on wheel 94, each being 7.5° wide, and a twelfth spot is provided which is 22.5° wide (corresponding to the last drain tank). PMS 96 and PMS 98 are spaced 15° apart.

All components of FIG. 8A are contained on a printed wiring board placed in proximity to the bottom of wheel 94 for the purpose of communicating with the dark/light code bars and to communicate to the remainder of the control system contained on the printed wiring board comprising control panel 24 via discrete wiring means known to the art.

Figure 8B:
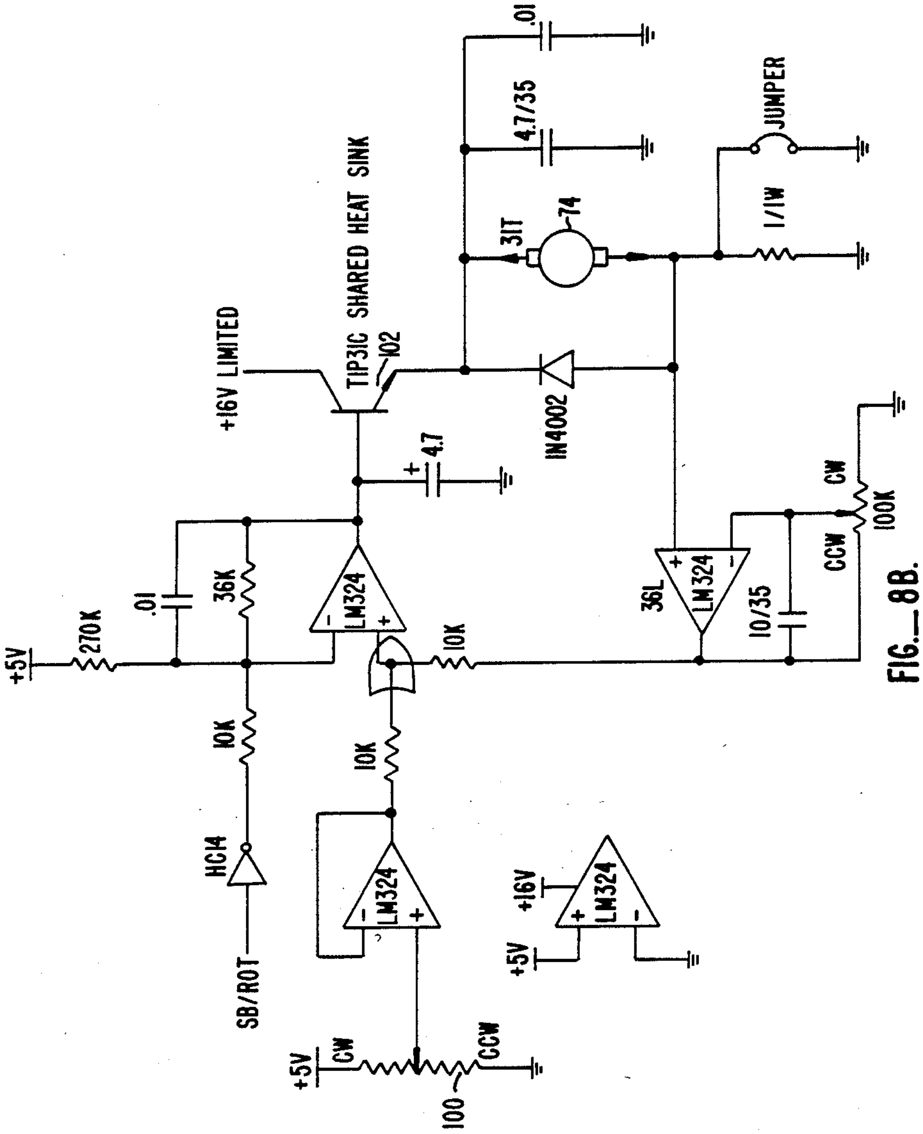

FIG. 8B shows the control circuitry for 16-volt D.C. agitation motor 74. Motor 74 is, for example, a Model No. 250 manufactured by Autotrol. Potentiometer 100 is installed on control panel 24, and is used to control drum rotation speed. The circuit further controls the motor 74 to compensate for variations in the load due to, for example, variations in chemical volume, the use of various sizes of drums, and the like. The motor is activated with the signal S3ROT via transistor 102.

Figure 8C:
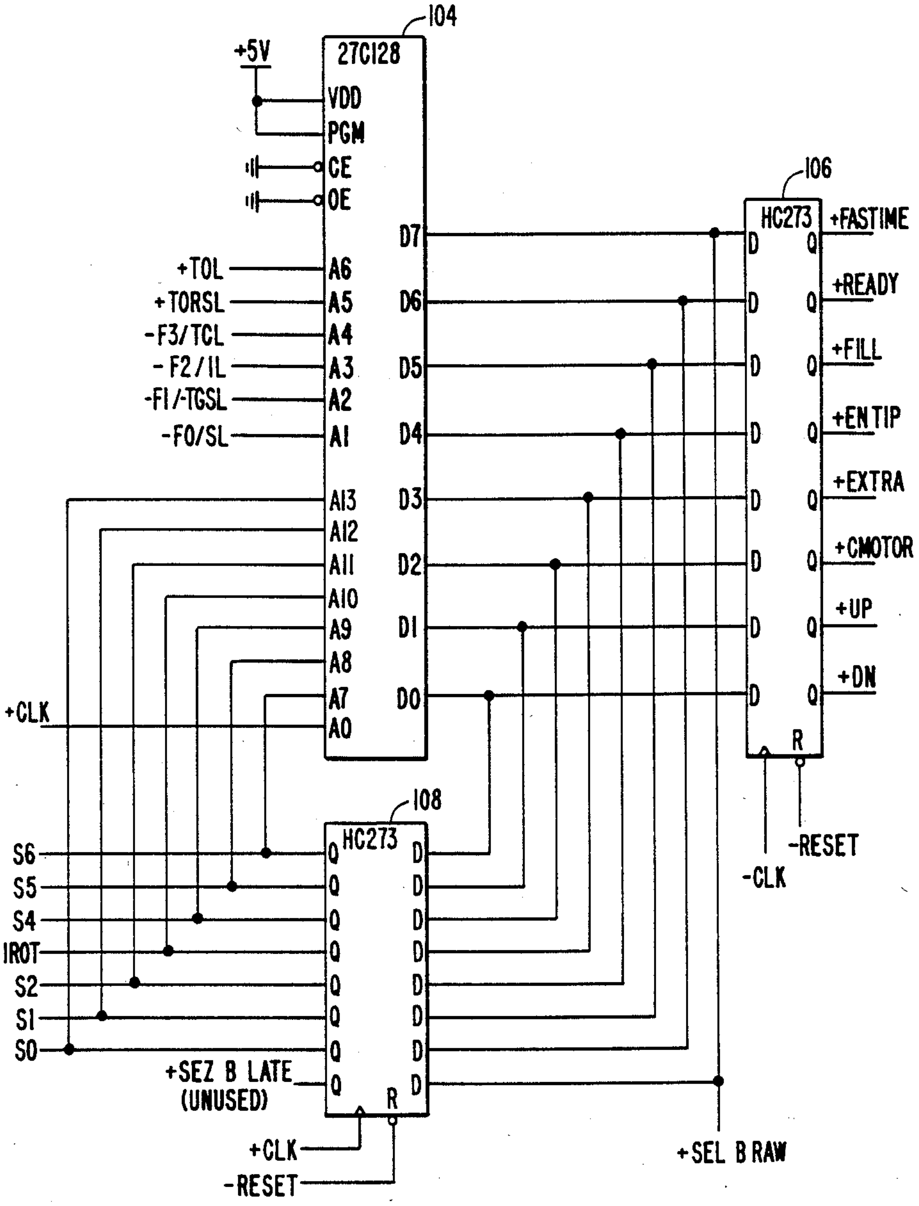

FIG. 8C shows stored program memory (EPROM) 104 connected to flip-flop packages 106 and 108. This memory and flip-flop configuration comprises what is commonly known as a synchronous sequential network. EPROM (electrically programmable read-only memory) is preferred and in one embodiment is an ultraviolet erasable 16k×8 EPROM. Memory 104 is programmed to direct the functions of the processor. Discrete logic may also be used to implement the functions of the memory but this would result in substantially higher cost, lower reliability, and lower flexibility for improvements. Flip-flop 108 is used to produce signals SØ to S6, and S3ROT which indicate the "state" of the processor while signals DN, UP, CMOTOR, ENTIM, FILL, READY, EXTRA, and FASTIM implement various functions of the machine. RESET is used to start the processor at a consistent start point. Signals TØL, TORSL, F3/TCL, F2/IL, F1/T65L, and FØ/SL provide input stimulus to the memory 104. The latter four signals are generated in a multiplexer discussed below. Signals from flip-flops 106 and 108 direct the function of the processor.

The READY signal from flip-flop 106 is used to illuminate LED 110 (see FIG. 8E) which provides the user with an indication that the machine is ready to begin processing photographic material by pressing a start/advance button. CMOTOR energizes the carousel motor 112 which drives table 54 and cam 34 via drive rod 56. Motor 112 is driven with a 16-volt power supply.

Transistors 116*a* and 116*b* in conjunction with resistors 118*a* and 118*b* act as a current limiter to protect motor 112 from over-current conditions. Resistor 120 serves to satisfy the "OFF" condition leakage current of driver 59*a*. Driver 59*a* activates this current limiter driver by providing control current through resistor 59*b*. Drivers 122*a* and 122*b* serve to invert the logical sense of the signal CMOTOR and provide a brake current to motor 112, respectively. This brake current is limited by resistor 118, and serves to short the windings of motor 112 when the current is turned off and causes the motor to stop rapidly, thereby permitting the cam and drain tanks to be precisely positioned.

Figure 8D:
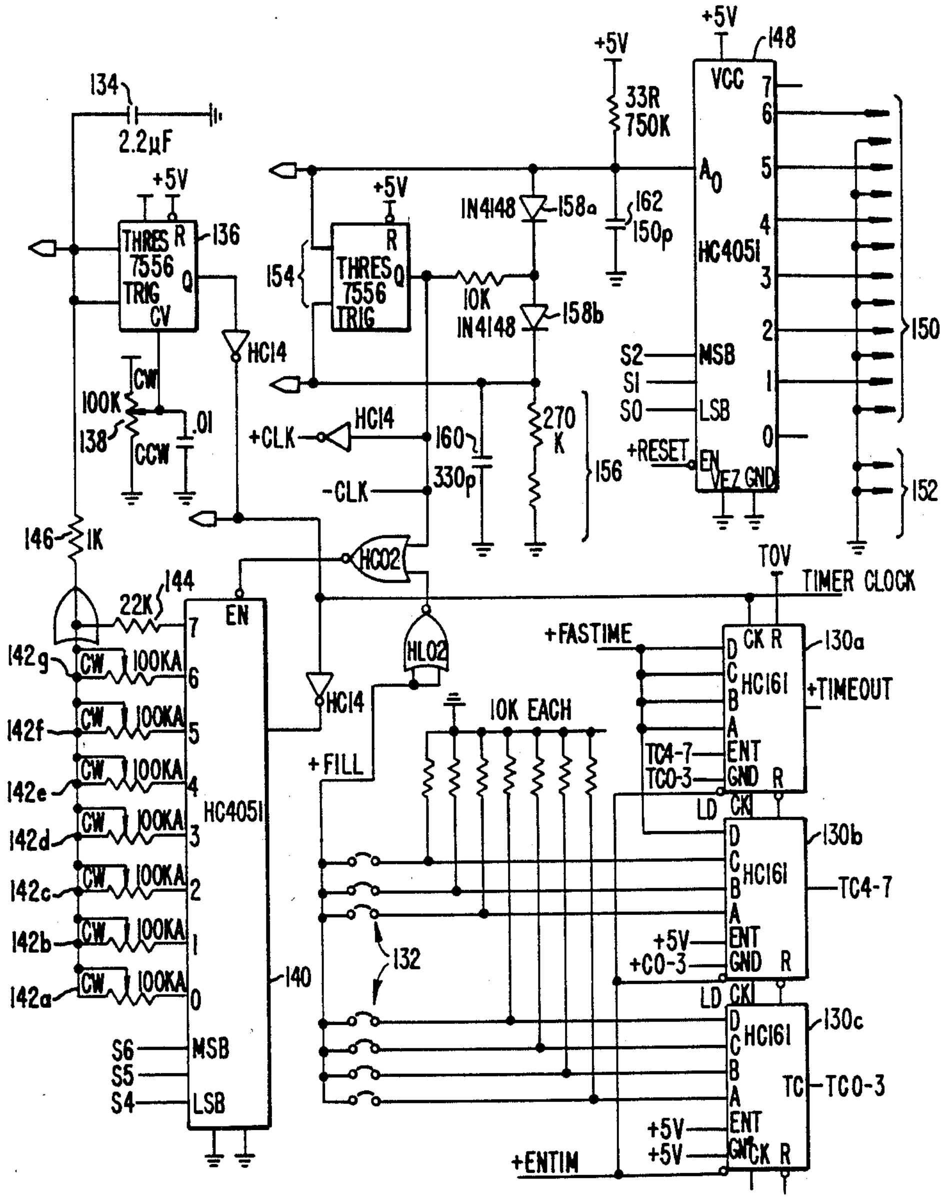
Figure 8E:
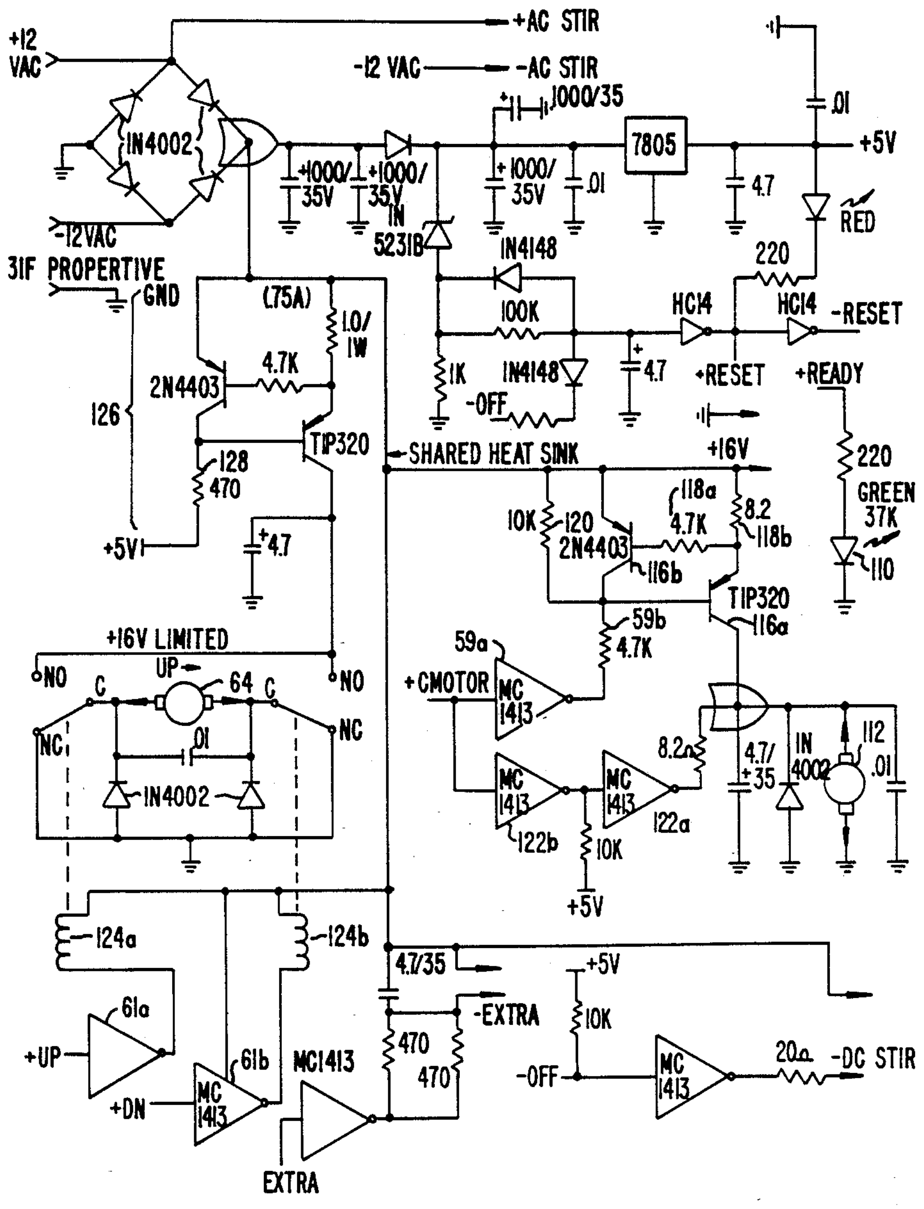

Signals +UP and +DOWN serve to operate the lift motor 64, as shown in FIG. 8E and FIG. 5. Drivers 61*a* and 61*b* drive relay coils 124*a* and 124*b*, respectively. The common contacts of the relays are connected to the armature contact points of the directcurrent motor 64. The configuration also provides braking action due to the shorting of the armature of motor 64 when not driven either "UP" or "DOWN". The signals +UP and +DOWN, therefore, serve to tip the drum 22 up/down at the determined time. Similar to the circuitry for the carousel motor 112, motors 64 and 74 are provided with current-limiting circuitry 126. The limiter, however, is continuously activated via connection through resistor 128 to +5V.

Programmable countdown dividers 130*a*, *b*, and *c*, illustrated in FIG. 8D, serve to time the period for draining, rotating and filling the drum. The circuits are pre-loaded with a value and the counter then "clocks" until it reaches its maximum, at which time it generates an output signal. FASTIM is active during the drain cycle and the fill cycle, but not during the agitation/rotation step. Jumpers 132 are used to calibrate the fill control time knob on the control panel (with a scaled decal behind the knob on the control panel) which permits the user to have the processor distribute precise volumes of liquid into the drum. ENTIM, when active, allows the counters to begin counting. When inactive, ENTIM, the initial value of the counter, is loaded.

FILL is active (i.e., a logical 1) when chemical is being distributed into the drum, i.e., when one of the valves is open, and allows the counters to have a unique initial value for filling. Capacitor 134 acts as a timing capacitor for the timer 136. Trim potentiometer 138 is used to calibrate the timer, and is adjusted so that the overall circuit may be trimmed to a desired level. A square wave signal is, therefore, produced at the input to analog multiplexer 140 which enables different values of resistance to be placed in the timer circuit so as to change its frequency. Variable potentiometers 142*a* to 142*g* are mounted on the control panel and are used to adjust the fill time (142*a*), and agitate times (142*b–g*). Fixed resistor 144 is used to establish drain time. Fixed resistor 146 is used to establish a minimum amount of time for which the controls may be adjusted (i.e., to prevent a short). Signals S6, S5, and S4 (from flip-flop 108) are used to select which of the legs are to be used. If all of the signals S4, S5, and S6 are "0", the fill leg is activated. If, for example, the signals have a binary value of 1, then the leg for agitating for chemical #1 is activated and timed accordingly.

Variable potentiometers 142*b–g* are preferably non-linear variable potentiometers of the type known to those of skill in the art. By using non-linear variable potentiometers parameters can be highly varied, for example, for agitation and fill control, with precise control at lower values of resistance.

Analog multiplexer 148 is connected to vessel probes 150 via wiring, and are stainless steel or equivalent inert probes in the bottom of each storage tank 14. Common probe 152 is placed in the water bath. Therefore, the circuit, when selected, acts as a capacitor with the water acting as a plate, the chemical acting as a second plate, and the PVC acting as a dielectric (the area of the chemical plate varying according to the level of chemical). Therefore, this "capacitor" has a value related to the height of liquid in the vessel. One of the tank probes is selected based on the input values S2, S1, and S0 (from sequencer 104), which is based upon the vessel being drained to drum 8. The timing circuit, therefore, is a circuit with a duty cycle dependent upon the value of the capacitor formed in the wall of vessel 14 and, therefore, by the height of fluid in vessel 14. The threshold of timer 154 is based on this circuit while the trigger is associated with a RC circuit 156 (which includes a variable resistor for calibration). Diodes 158*a* and 158*b* cause the capacitor 160 to charge in less time than it takes for capacitor 162 to charge (as well as the reverse). The above circuitry could also be used in a variety of vessels other than photograph processors.

Therefore, timing for the chemistry coming from each tank is adjusted based on the volume in each tank. This helps to account for variations in the head level in each tank to insure that a proper amount of chemistry is distributed.

Figure 8F:
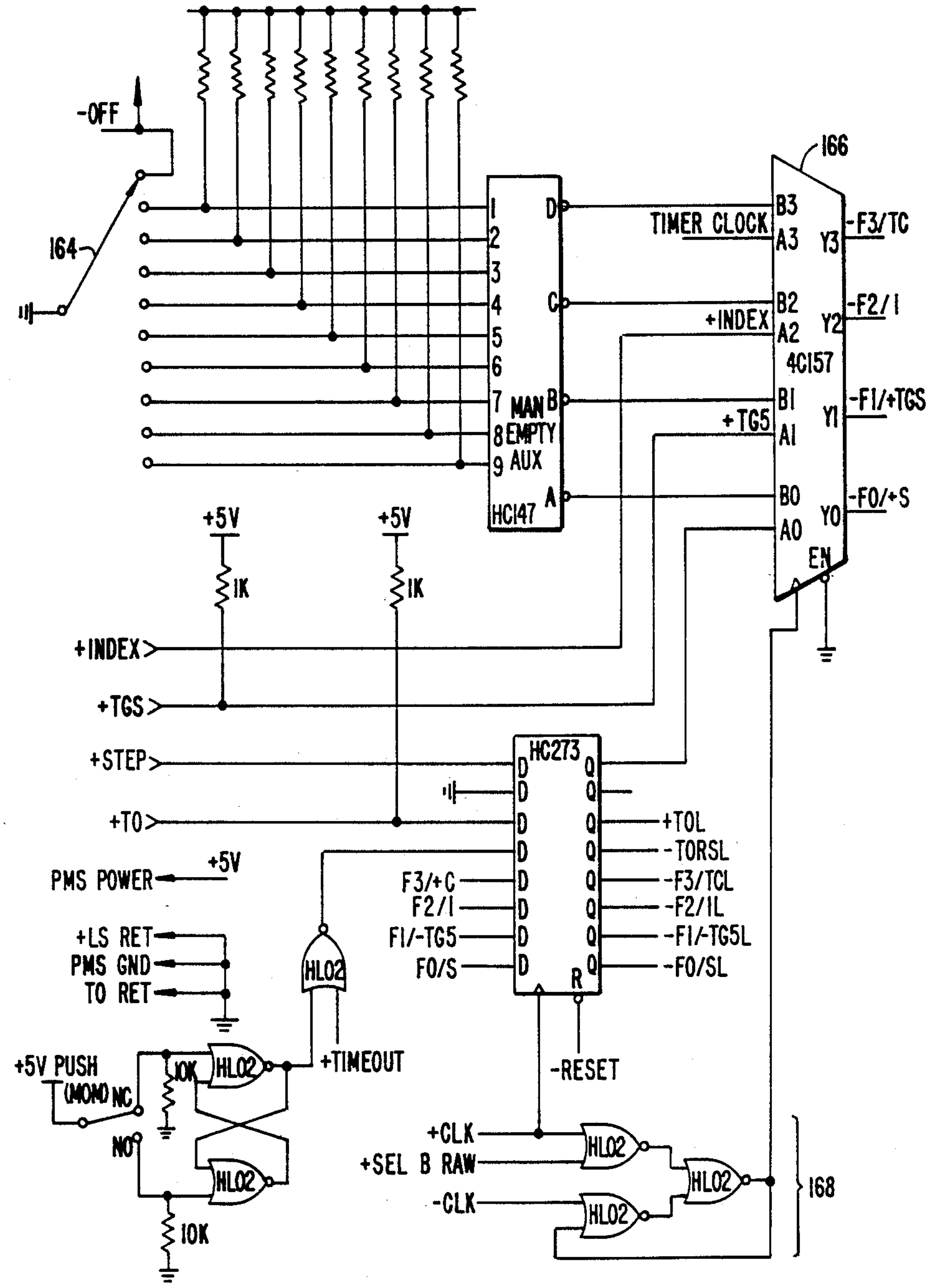

FIG. 8F illustrates switch 164 (a rotary switch on the control panel) which is used to select how many chemicals are to be used in the process. A seventh channel is provided to indicate a manual process is desired (e.g., the user wishes to time the chemical mixing manually). The remaining position instructs the processor to go to the "fill" position for each tank and remain open. This permits draining of the tanks through the processor. A reset and spare position is also provided. Based on the function switch location, a binary signal is sent from A, B, C, and D which enters multiplexer 166. The signals INDEX and STEP (from the photo micro sensor circuitry - see FIG. 8A), and T65 and TØ from switches (not shown), which indicate when the drum is in the upright and horizontal positions, respectively, are also introduced. Latch 168, via signal SEC B RAW (from memory 104) determines which of the signals (INDEX, the function switch, etc.) will be "looked" at. The sequencer, therefore, determines not only output values but also which input variables will be analyzed.

The coding for memory 104 is provided in Table 1. The sequential state machine program describes the functional operation of the processor for the purpose of coding the EPROM memory.

Each "while" statement and all subsequent "IF" and "ELSE" statements to the next "while" statement can be coded from a single state of the 128 states possible. This is true since there are no cases wherein "FUNCTION" must be examined via SELECTB active and one or more of "TIMER CLOCK", "INDEX", "T65", and "STEP" must be examined by making SELECTB inactive.

Each state variable consists of 2 bytes (16 bits) multiplexed by "+CLK" connected to the A0 address of the EPROM. The first byte out representing the next state, and the next representing the miscellaneous control outputs. The six miscellaneous inputs provide 64-way branching within one state by virtue of connection to address "A1 through A6" on the EPROM.

The program names those state bits and output bits when the value must be a logical 1. Otherwise (when unnamed) they are logical 0. State bits S6, S5, and S4 are binary coded and named S654. Similarly bits S2, S1, and S0 are coded and named S210.

When S654 or S210 are not specified they may be any value (0 to 7) provided that when the whole program is taken together all states are unique, i.e., each "while-IF-ELSE-GOTO" clause must produce after assignment of values for unspecified S654 and S210 fields. Note that the S3ROT bit is also a bit of the state variable but is specified directly in the "while" clauses.

Unused states are programmed with the following statement:

```
while (TRUE) S654=0, S210=0
```

This causes a branch to the initial RESET state (state 0). This affords a measure of fault tolerance but is useful as a means of providing predictability since the default values of EPROMS from different manufacturers vary.

TABLE 1

| | |
|---|---|
| RESET: | [Caused by POWER ON |
| (state 0) | initialization circuit] |
| | IF (.NOT.T0) GOTO RECLINE |
| | IF (.NOT.(STEP.AND.INDEX)) GOTO FINDINDEX |
| | ELSE GOTO BEGIN |
| RECLINE: | while (.NOT.T0) DN |
| | IF (.NOT.(STEP.AND.INDEX)) GOTO FINDINDEX |
| BEGIN: | while (TORS) |
| | while (.NOT.TORS) READY, SELECTB |
| | IF (1≦FUNCTION≦6) GOTO AUTO |
| | IF (FUNCTION.EQ.7) GOTO MAN |
| | IF (FUNCTION.EQ.8) GOTO EMPTY |
| | IF (FUNCTION.EQ.9) GOTO BEGIN |
| | ELSE GOTO BEGIN |
| MAN: | while (TORS) S3ROT |
| | while (.NOT.TORS) S3ROT, READY |
| | ELSE GOTO TIP6 |

TABLE 1-continued

| | |
|---|---|
| EMPTY: | while (STEP) CMOTOR |
| | while (.NOT.STEP) CMOTOR |
| | while (.NOT.TORS) READY |
| | while (STEP) CMOTOR |
| | while (.NOT.STEP) CMOTOR |
| | IF (INDEX) GOTO BEGIN |
| | ELSE GOTO EMPTY |
| FINDINDEX: | while (.NOT.(STEP.AND.INDEX)) CMOTOR |
| | ELSE GOTO BEGIN |
| AUTO: | while (STEP) S3ROT, CMOTOR |
| | while (.NOT.STEP) S3ROT, CMOTOR |
| | while (.NOT.TORS) S3ROT, S210=1, FAST, FILL, ENTIM |
| | while (STEP) S3ROT, CMOTOR |
| | while (.NOT.STEP) S3ROT, CMOTOR |
| | while (.NOT.TORS) S654=1, S3ROT, ENTIM |
| | while (.NOT.T65) UP |
| | while (.NOT.TORS) S654=7, FAST, ENTIM |
| | while (.NOT.T0) DN, SELECTB |
| | IF (FUNCTION.EQ.1) GOTO FINDINDEX |
| | while (STEP) S3ROT, CMOTOR |
| | while (.NOT.STEP) S3ROT, CMOTOR |
| | while (.NOT.TORS) S3ROT, S210=2, FAST, FILL, ENTIM |
| | while (STEP) S3ROT, CMOTOR |
| | while (.NOT.STEP) S3ROT, CMOTOR |
| | while (.NOT.TORS) S654=2, S3ROT, ENTIM |
| | while (.NOT.T65) UP |
| | while (.NOT.TORS) S654=7, FAST, ENTIM |
| | while (.NOT.T0) DN, SELECTB |
| | IF (FUNCTION.LE.2) GOTO FINDINDEX |
| | while (STEP) S3ROT, CMOTOR |
| | while (.NOT.STEP) S3ROT, CMOTOR |
| | while (.NOT.TORS) S3ROT, S210=3, FAST, FILL, ENTIM |
| | while (STEP) S3ROT, CMOTOR |
| | while (.NOT.STEP) S3ROT, CMOTOR |
| | while (.NOT.TORS) S654=3, S3ROT, ENTIM |
| | while (.NOT.T65) UP |
| | while (.NOT.TORS) S654=7, FAST, ENTIM |
| | while (.NOT.T0) DN, SELECTB |
| | IF (FUNCTION.LE.3) GOTO FINDINDEX |
| | while (STEP) S3ROT, CMOTOR |
| | while (.NOT.STEP) S3ROT, CMOTOR |
| | while (.NOT.TORS) S3ROT, S210=4, FAST, FILL, ENTIM |
| | while (STEP) S3ROT, CMOTOR |
| | while .NOT.STEP) S3ROT CMOTOR |
| | while (.NOT.TORS) S654=4, S3ROT, ENTIM |
| | while (.NOT.T65) UP |
| | while (.NOT.TORS) S654=7, FAST, ENTIM |
| | while (.NOT.T0) DN, SELECTB |
| | IF (FUNCTION.LE.4) GOTO FINDINDEX |
| | while (STEP) S3ROT, CMOTOR |
| | while (.NOT.STEP) S3ROT, CMOTOR |
| | while (.NOT.TORS) S3ROT, S210=5, FAST, FILL, ENTIM |
| | while (STEP) S3ROT, CMOTOR |
| | while (.NOT.STEP) S3ROT, CMOTOR |
| | while (.NOT.TORS) S654=5, S3ROT, ENTIM |
| | while (.NOT.T65) UP |
| | while (.NOT.TORS) S654=7, FAST, ENTIM |
| | while (.NOT.T0) DN, SELECTB |
| | IF (FUNCTION.LE.5) GOTO FINDINDEX |
| | while (STEP) S3ROT, CMOTOR |
| | while (.NOT.STEP) S3ROT, CMOTOR |
| | while (.NOT.TORS) S210=6, FAST, FILL, ENTIM |
| | while (.NOT.(STEP.AND.INDEX)) S3ROT, CMOTOR |
| | while (.NOT.TORS) S654=6, S3ROT, ENTIM |
| TIP6: | while (.NOT.T65) UP |
| | while (.NOT.TORS) S654=7, FAST, ENTIM |
| | while (.NOT.T0) DN, SELECTB |
| | GOTO BEGIN |

© Copyright, Alto Technology, 1988

It is to be understood that the above description is intended to be illustrative and not restrictive. The scope of the invention should, therefore, not be determined with reference to the above description but instead should be determined with reference to the appended claims, along with the full range of equivalents to which they are entitled.

What is claimed is:

1. Apparatus for developing photographic material comprising:

(a) cylindrical, light-tight means for holding said material in a rolled fashion, the means for holding having a drain port;

(b) means for rotating said means for holding from a first position to a second position, said first position arranged to drain a liquid from said means for holding from said drain port, said second position arranged to retain a liquid in said means for holding;

(c) means for rotating said means for holding about its axis while in said second position;

(d) at least a first and a second means for storing at least a first and a second processing fluid, respectively, said means for storing arranged above said means for holding, so as to feed the fluid into said means for holding by gravity, and further comprising first and second valve-operated drain means on said first and second means for storing;

(e) a manifold means, said manifold means operably connected to the valve-operated drain means on said first and said second means for storing, said manifold means draining to said drain port by gravity;

(f) a rotatable table under said means for holding, said rotatable table holding at least a third and a fourth means for storing said first and said second processing fluid, respectively, said rotatable table driven by a rotating shaft;

(g) cam means on said rotating shaft, said cam means opening said valve-operated drain means when aligned therewith;

(h) tubular means oriented to drain liquid from said means for holding to a position above the rotatable table when said means for holding is in the first position;

(i) control means, said control means adapted to orient said elements (a)-(h) in at least the following sequential configurations:

(i) a first configuration in which said first operated drain is opened by said cam, said second valve-operated drain is closed, and said means for holding is in said second position and, thereafter;

(ii) a second configuration in which said first and said second valve-operated drains are closed, and said means for holding is in said second position, and said means for rotating said means for holding about its axis rotates said means for holding and, thereafter;

(iii) a third configuration in which said first and said second valve means are closed, said means for holding is rotated into said first position by said means for rotating from a first position to a second position, and said means for holding drains through said tubular means and into said third means for storing and, thereafter;

(iv) a fourth configuration in which said second operated drain is opened by said cam, said first operated drain is closed and said means for holding is in said second position and, thereafter;

(v) said second configuration and, thereafter;

(vi) a fifth configuration in which said first and said second valve means are closed, said means for holding is rotated into said first position by said means for rotating from a first position to a second position, and said means for holding drains through said tubular means into said fourth means for storing.

2. Apparatus as recited in claim 1 further comprising means for timing said first and said fourth configurations in proportion to a liquid level in said first and said second means for storing respectively.

3. Apparatus as recited in claim 2, wherein said means for timing further comprises:

(a) a first electrode mounted on an interior wall of said means for storing;

(b) a second electrode on an exterior of said means for storing; and (c) means responsive to an electrical potential across said first and said second electrode for adjusting said means for timing.

4. Apparatus as recited in claim 1, wherein said control means further comprises a stored program sequencer.

5. Apparatus for developing photographic materials comprising:

(a) means for holding a photographic processing container;

(b) a means attached to said means for holding for agitating said means for holding, said means for agitating comprising an electric motor for rotating the photograph processing container; and (c) means connected to said means for agitating for compensating for variations in load in said photographic processing container.

6. Apparatus for developing photographic materials comprising:

(a) means for receiving a plurality of processing chemicals, said means for receiving further comprising:

(i) at least two chemical storage vessels; and (ii) manifold and valve means for selectively distributing fluids from said chemical storage vessels to a common manifold drain point, said valve means operated by a rotating cam;

(b) means below said means for receiving for holding a photographic processing container, said means for holding having a port connected to said means for receiving and adapted to distribute liquid to the photographic processing container by gravity flow;

(c) means for rotating said means for holding to a position in which a liquid would flow out from said port to a drain; and (d) means located below said drain for selectively flowing liquid from said drain into one of at least two chemical receiving vessels, said means for selectively flowing liquid from said drain into at least one of two chemical receiving vessels comprising a rotating table holding said receiving vessels, said cam and said rotating table operated by a common rotating shaft.

7. Apparatus for developing photographic materials comprising:

(a) means for receiving a plurality of processing chemicals, said means for receiving further comprising:

(i) at least two chemical storage vessels; and (ii) manifold and valve means for selectively distributing fluids from said chemical storage vessels to a common manifold drain point, said manifold drain point flowing to said port;

(b) means below said means for receiving for holding a photographic processing container;

(c) means located below said drain for selectively flowing liquid from said processing container into one of at least two chemical receiving vessels;
(d) control means for opening said valve means, agitating said photograph processing container, and draining fluid into said chemical receiving vessels;
(e) a rotating cam for opening said valve means; and
(f) a series of light and dark marks for indicating a position of said cam to said control means with a photo micro sensor for detecting said series of light and dark marks.

8. Apparatus for developing photographic materials comprising:
(a) means for receiving a plurality of processing chemicals, said means for receiving further comprising:
(i) at least two chemical storage vessels; and
(ii) manifold and valve means for selectively distributing fluids from said chemical storage vessels to a common manifold drain point, said valve means operated by a rotating cam, said manifold drain point flowing to a port, said means for selectively distributing liquid from said drain into at least one of two chemical receiving vessels comprising a rotating table holding said receiving vessels;
(b) means below said means for receiving for holding a photographic processing container, said means for holding having said port connected to said means for receiving;
(c) an electric motor for rotating said table; and
(d) means for braking said motor at a selected time.

9. Apparatus as recited in claim 8, wherein said means for braking is a means for shorting windings of said motor.

10. Apparatus for developing photographic materials comprising:
(a) means for receiving a plurality of processing chemicals;
(b) means below said means for receiving for holding a photographic processing container, said means for holding having a port connected to said means for receiving;
(c) means located below said drain for selectively flowing liquid from said processing container into one of at least two chemical receiving vessels; and
(d) a means for controlling an opening time of said valve means, said means for controlling further comprising a first electrode mounted in an interior of said storage vessels, said second electrode mounted outside of said storage vessels, and a timing circuit responsive to a voltage applied across said first and said second electrode.

11. A kit for a photograph processor comprising:
(a) means for storing a plurality of processing chemicals;
(b) manifold means for distributing the plurality of chemicals to a drain port by gravity;
(c) valves for opening said means for storing;
(d) cam means for opening said valves;
(e) means for holding a photograph processing container;
(f) means for agitating a photograph processing container;
(g) means for rotating a photograph processing container to drain fluid therefrom;
(h) means for selectively receiving chemicals drained from a photograph processing container by gravity to a plurality of drain tanks; and
(i) control means, said control means further comprising means for adjusting a time for opening the valve means in response to a liquid level in said means for storing.

12. Apparatus as recited in claim 11, wherein said control means further comprises a means for adjusting an agitation time of said means for agitating, said means for adjusting further comprising a variable potentiometer, said variable potentiometer adjusting a frequency of a timer circuit.

13. Apparatus as recited in claim 12, wherein said variable potentiometer is a non-linear variable potentiometer.

* * * * *